(12) United States Patent
Svochak et al.

(10) Patent No.: US 7,296,890 B2
(45) Date of Patent: Nov. 20, 2007

(54) CONTACT LENS WITH CONTROLLED SHAPE

(75) Inventors: Jan Barry Svochak, Hurst, TX (US); William Donald Dixon, Fort Worth, TX (US)

(73) Assignee: TruForm Optics, Euless, TX (US)

( * ) Notice: Subject to any disclaimer, the term of this patent is extended or adjusted under 35 U.S.C. 154(b) by 0 days.

(21) Appl. No.: 11/257,981

(22) Filed: Oct. 25, 2005

(65) Prior Publication Data
US 2007/0091259 A1 Apr. 26, 2007

(51) Int. Cl.
*G02C 7/04* (2006.01)
(52) U.S. Cl. .................................. 351/160 R
(58) Field of Classification Search ..... 351/160 R–167
See application file for complete search history.

(56) References Cited

U.S. PATENT DOCUMENTS

| | | | |
|---|---|---|---|
| 6,082,856 A | 7/2000 | Dunn et al. | 351/160 H |
| 6,406,145 B1 | 6/2002 | Jubin | 351/177 |
| 6,808,262 B2 | 10/2004 | Chapoy et al. | 351/161 |
| 6,896,368 B2 | 5/2005 | Baugh | 351/161 |
| 6,902,273 B2 | 6/2005 | Suzaki et al. | 351/177 |
| 2005/0146678 A1 | 7/2005 | Chou et al. | 351/160 |

*Primary Examiner*—Scott J. Sugarman
*Assistant Examiner*—Darryl J. Collins
(74) *Attorney, Agent, or Firm*—Duke W. Yee; Theodore D. Fay, III

(57) ABSTRACT

A contact lens including a single component lens sized and dimensioned for placement on a cornea of an eye. The single component lens includes a first base curve for the back surface of the single component lens, wherein the first base curve is associated with the first sub-axis; a second base curve for the back surface, wherein the second base curve is associated with the second sub-axis; a third base curve for back surface, wherein the third base curve is associated with the third sub-axis; and a fourth base curve for the back surface, wherein the fourth base curve is associated with the fourth sub-axis. The first base curve, the second base curve, the third base curve, and the fourth base curve are selected to form a shape for the back surface of the single component lens that conforms to a measured shape of the cornea.

16 Claims, 3 Drawing Sheets

CONTACT LENS WITH CONTROLLED SHAPE

BACKGROUND OF THE INVENTION

1. Technical Field

The present invention is directed generally toward a contact lens and a method for making a contact lens. More specifically, the present invention is directed to a contact lens having a base curve that conforms closely to the shape of a cornea of an eye.

2. Description of Related Art

Contact lenses are becoming increasingly sophisticated in their optical characteristics. The optical characteristics of a contact lens are created by changing the nature of the front side of the contact lens. For example, a multi-focal soft contact lens that has a main carrier lens and a smaller near vision lenslet supported on the carrier lens is known. Other contact lenses change the wavefront properties of the front side of the contact lens for correcting high order aberrations. Furthermore, contact lenses may be made that are specifically tailored to an individual person's eyes.

However, a problem associated with known contact lenses is maintaining the position of a contact lens on the human eye. As a person blinks and moves his or her eyes, the contact lens will move. This movement causes the contact lens to shift on the person's eye. This shift typically causes rotation of the contact lens towards the person's nose. The result of this type of rotation is that the optical axis of the contact lens no longer matches the optical axis of the eye. Because the contact lens has specially tailored optical properties that depend on the orientation of the visual axis vis-à-vis the person's eye, the movement of the contact lens can cause the person's vision to become distorted. In addition, the shifting of the contact lens can cause discomfort in the person's eye. These two factors cause many patients to be reluctant to wear specially tailored contact lenses.

The problem of fitting a contact lens on a patient's eye so that the visual axis of the contact lens matches the patient's visual axis is known. One known method of addressing the problem is to use large diameter soft contact lenses. These contact lenses use a plastic portion outside of the visual portion, or central region, of the contact lens to orient the contact lens on the patient's eye. The plastic portion increases the amount of contact lens contacting the cornea. The plastic portion also may be formed to rest against or contact the patient's eyelid or eyelids to help maintain the contact lens in a particular orientation. However, this type of contact lens is often uncomfortable for the patient.

Another presently used method of addressing the problem of sitting contact lenses is to create a toric base curve on the contact lens to create a toric lens. Generally, the base curve is the shape of the back surface of a contact lens at any particular point or associated with any particular axis defined with respect to the contact lens. The base curve of a toric lens may be defined by two perpendicular meridians that each define a spherical curve, though the radius of curvature for each meridian is different. However, the patient must have a significant amount of astigmatism or corneal deformation for this type of lens to be a viable option. In addition, a contact lens with a toric base curve will induce astigmatism that must be negated on the front surface of the lens. Further, a patient who requires only a slightly toric lens would experience more lens rotation while wearing the contact lens and which would create more visual problems. Based on the distribution of high astigmatism in the population, this type of contact lens is only suitable for between about ten percent and about twenty percent of the population.

The problems associated with seating specially tailored contact lenses have resulted in patients with unmet optical needs. Furthermore, the business of specially tailored contact lenses is limited because only a relatively small fraction of patients can or will use these types of specially tailored contact lenses. Therefore, it would be advantageous to have an improved contact lens for seating a contact lens on the cornea of an eye.

SUMMARY OF THE INVENTION

The present invention provides a contact lens. The contact lens includes a single component lens sized and dimensioned for placement on a cornea of an eye, said single component lens having a front surface and a back surface, wherein the back surface is formed to fit the cornea of the eye. The single component lens also includes a first axis defined with respect to the single component lens, wherein the first axis has a first sub-axis and a second sub-axis. The single component lens also includes a second axis defined with respect to the single component lens, wherein the second axis has a third sub-axis and a fourth sub-axis. The first axis and the second axis are orthogonal to each other. The single component lens also includes a first base curve for the back surface, wherein the first base curve is associated with the first sub-axis. The single component lens also includes a second base curve for the back surface, wherein the second base curve is associated with the second sub-axis. The single component lens also includes a third base curve for back surface, wherein the third base curve is associated with the third sub-axis. The single component lens also includes a fourth base curve for the back surface, wherein the fourth base curve is associated with the fourth sub-axis. The first base curve, the second base curve, the third base curve, and the fourth base curve are selected to form a shape for the back surface of the single component lens that conforms to a measured shape of the cornea.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
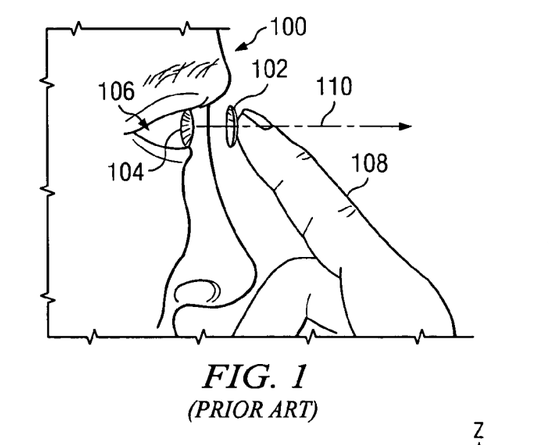
FIG. 1 shows a prior art method of a human placing a contact lens on the cornea of the eye, in accordance with an illustrative embodiment of the present invention.

With reference now to the figures and in particular with reference to FIG. 1, FIG. 1 shows a prior art method of a human 100 placing contact lens 102 on cornea 104 of eye 106, in accordance with an illustrative embodiment of the present invention. Contact lens 102 of the present invention may be placed onto cornea 104 of eye 106 by any convenient method, aside from using finger 108 as shown. The contact lenses of the present invention may also be sized and dimensioned for use on animal eyes, or may be sized and dimensioned as optical lenses on optical devices.

Figure 2:
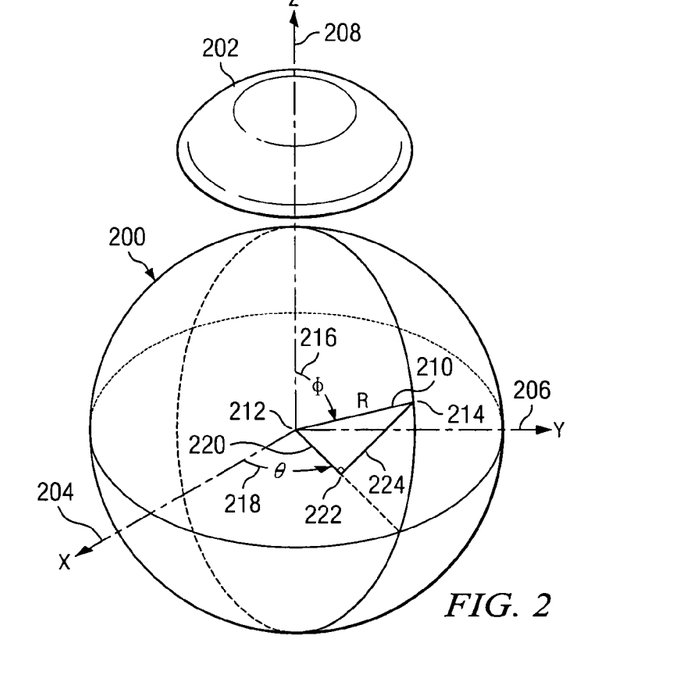
FIG. 2 shows a reference system for describing the shape of a contact lens, in accordance with an illustrative embodiment of the present invention.

FIG. 2 shows a reference system 200 for describing the shape of contact lens 202, in accordance with an illustrative embodiment of the present invention. Contact lens 202 may correspond to contact lens 102. Reference system 200 includes X-axis 204, Y-axis 206, and Z-axis 208. Each axis is orthogonal (perpendicular) to the other, such that a ninety degree angle exists between each axis. Any two axes are in the same plane and one axis is always perpendicular to the other two axes. Within the limits already described, each axis may be oriented in any particular manner with regard to a contact lens. However, for purposes of describing contact lenses herein, Z-axis 208 is considered to lie along the visual axis of the contact lens, such as visual axis 110 shown in FIGS. 1. X-axis 204 and Y-axis 206 lie in a plane in which the lowest point of the edge of the contact lens is also located, although contact lens 202 and coordinate system 200 shown in FIG. 2 are separated to better show the both contact lens 202 and the coordinate system 200. The coordinate system described by X-axis 204, Y-axis 206, and Z-axis 208 is known as a Cartesian coordinate system.

The shape of a contact lens may also be described using other coordinate systems. For example, as further shown in FIG. 2, the shape of contact lens 202 may be described using a spherical coordinate system. A spherical coordinate system uses three terms relative to the Cartesian coordinate system. The first term is R 210, which represents the distance between central point 212 to some other point 214, such as a point on a contact lens. The second term is Φ 216, which represents the angle between Z-axis 208 and R 210. The angle Φ 216 may also be described as the polar angle. The second term Θ 218 represents the angle between X-axis 204 and line 220. Line 220 lies in the X-Y plane defined by X-axis 204 and Y-axis 206. Line 220 is drawn between central point 212 and second point 222. Second point 222 lies at the intersection between second line 224 drawn between point 214 and the X-Y plane. Thus, line 220, line 224, and R 210 form a right triangle. The angle Θ 218 may also be referred to as the azimuth angle.

If the values of R 210, Φ 216, and Θ 218 are known, then the exact point on a contact lens may be determined. Thus, the spherical coordinate system may be used to describe the shape of a contact lens.

In addition to the Cartesian coordinate system and the spherical coordinate systems described above, other coordinate systems may also be used. For example, the shape of contact lens 202 may be described using a cylindrical coordinate system, as is known in the art. Other coordinate systems may also be used to describe the shape of the contact lens. The contact lenses of the present invention are not intended to be limited by the mathematical method by which their shape is described.

Figure 3:
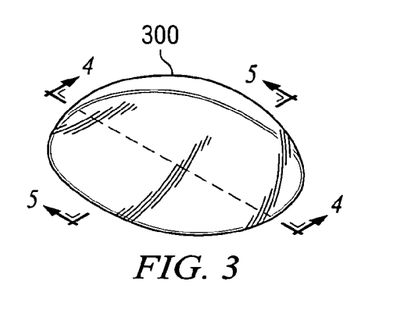
FIG. 3 shows a contact lens, in accordance with an illustrative embodiment of the present invention.

FIG. 3 shows a contact lens 300, in accordance with an illustrative embodiment of the present invention. Contact lens 300 may correspond to contact lens 202 in FIG. 2. Contact lens 300 may be any type of contact lens, such as a hard contact lens, soft contact lens, or any other type of contact lens. As described further below, the base curve of contact lens 300 may be adapted to exactly conform to the shape of a particular eye. The base curve is the shape of the back surface of contact lens 300 at any particular point or associated with any particular axis.

Figure 4:
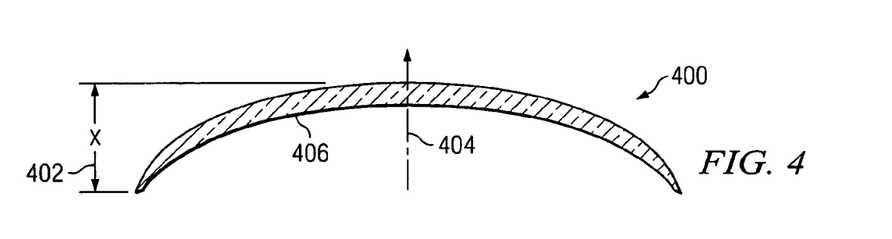
FIG. 4 shows a cross section of the contact lens shown in FIG. 3, in accordance with an illustrative embodiment of the present invention.
Figure 5:
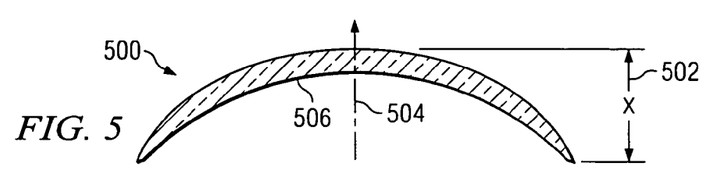
FIG. 5 shows a cross section of the contact lens shown in FIG. 3, in accordance with an illustrative embodiment of the present invention.

As used herein, shape of the back surface of a contact lens is "associated with" a particular axis or sub-axis if the shape of the back surface of the contact lens varies according to a single pre-selected mathematical formula for each point along the particular axis or sub-axis. If multiple formulae are associated with multiple axes or sub-axes of the contact lens, then the overall base curve varies according to the combination of all of the formulae associated with each axis or sub-axis. Thus, the overall shape of the back surface of the contact lens may be described as a combination of sub-formulae which each define the shape of the lens associated with a given axis. This principle is shown in FIG. 4 and FIG. 5, below. Examples of formulae that describe the base curve are provided in the description of FIG. 8.

Contact lens 300 has a base curve that is modified in sections to provide rotational stability. When a patient wears the contact lens of the present invention, the contact lens will often rotate or shift, but naturally will be urged back into alignment with the person's visual axis because the base curve of the contact lens matches the shape of the patient's cornea. Thus, rotational stability allows the lens to better fit an individual patient's eye. Rotational stability also allows the contact lens to correct high order aberrations because the ability of a contact lens to correct high order aberrations is limited by the movement of the lens on the eye.

FIG. 4 shows a cross section of the contact lens shown in FIG. 3, in accordance with an illustrative embodiment of the present invention. Contact lens 400 corresponds to contact lens 300 in FIG. 3. FIG. 4 shows the cross section of contact lens 300 defined along the line 4—4 shown in FIG. 3. Line 4—4 may also be referred to as a first meridian and may be considered to lie along the Y-axis. Contact lens 400 has a height, "X," as indicated by arrows 402. The term "height" describes a distance along visual axis 404. Visual axis 404 shows the orientation of the contact lens with respect to an eye. Visual axis 404 may be considered to lie along the Z-axis. Contact lens 400 has a varying thickness in this example. The thickness is defined as the distance between the back surface and the front surface. A change in the thickness of contact lens 400 changes the optical properties of contact lens 400. The thickness of contact lens 400 is determined according to the desired optical properties of contact lens 400.

The shape of the cross section of contact lens 400 is aspherical. Base curve 406 of contact lens 400 is the curve defined by the shape of the back surface of the contact lens. The back surface of the contact lens is the surface that rests against and is disposed on the cornea of the eye when contact lens 400 is placed on the eye during normal use. Base curve 406 of contact lens 400 is defined by a mathematical sub-formula that defines an aspherical curve. For example, base curve 406 may be an ellipse, though base curve 406 may have any shape, including an irregular shape.

FIG. 4 shows a single cross section of contact lens 300 along first meridian 4—4. In addition, a series of cross sections drawn along lines parallel to first meridian 4—4 are governed by the same mathematical sub-formula that defines base curve 406 shown in FIG. 4. Thus, the shape of base curve 406 along any cross section drawn parallel to first meridian 4—4 corresponds to the shape of base curve 406 at first meridian 4—4. Thus, the entire back surface of contact lens 300 associated with the Y-axis has an aspherical shape.

FIG. 5 shows a cross section of the contact lens 500 shown in FIG. 3, in accordance with an illustrative embodiment of the present invention. Contact lens 500 corresponds to contact lens 300 in FIG. 3. FIG. 5 shows the cross section of contact lens 300 defined along the line 5—5 shown in FIG. 3. Line 5—5 may also be referred to as a second meridian and may be considered to lie along the X-axis. First meridian 4—4 intersects second meridian 5—5 in the visual center, or apex, of contact lens 300 in FIG. 3. First meridian 4—4 and second meridian 5—5 are orthogonal, or perpendicular, to each other. Contact lens 500 has a height, "X," as indicated by arrows 502. The term "height" describes a distance along visual axis 504. The height, "X" in both FIG. 4 and FIG. 5 is the same to indicate that the highest point along the visual axis in FIG. 4 is the same as the highest point along the visual axis shown in FIG. 5.

Visual axis 504 shows the orientation of the contact lens with respect to an eye. Visual axis 504 may be considered to lie along the Z-axis. Contact lens 500 has a varying thickness, wherein the thickness is defined as the distance between the back surface and the front surface as measured along a line perpendicular to the back surface of contact lens 500. A change in the thickness of contact lens 500 changes the optical properties of contact lens 500. The thickness of contact lens 500 is determined according to the desired optical properties of contact lens 500.

The shape of the cross section of contact lens 500 is spherical in this example. Thus, base curve 506 of contact lens 500 cross section 5—5 is defined as part of a sphere. Base curve 506 of contact lens 500 is the curve defined by the back surface of the contact lens. The back surface of the contact lens is the surface that rests against and is disposed on the cornea of the eye when contact lens 500 is placed on the eye. Base curve 506 of contact lens 500 is defined by a mathematical sub-formula that defines a spherical curve.

FIG. 5 shows a single cross section of contact lens 300 in FIG. 3 along second meridian 5—5. In addition, a series of cross sections drawn along lines parallel to second meridian 5—5 are governed by the same mathematical sub-formula that defines base curve 506 shown in FIG. 5. Thus, the shape of base curve 506 along any cross section drawn parallel to second meridian 5—5 corresponds to the shape of base curve 506 at second meridian 5—5. Thus, the entire back surface of contact lens 300 associated with the X-axis has a spherical shape.

Contact lens 300 described in FIG. 3 through FIG. 5 has a spherical base curve associated with the X-axis and an aspherical base curve associated with the Y-axis. Thus, contact lens 300 may be described as a spherical-aspherical contact lens. A spherical-aspherical contact lens may be used by patients having astigmatism or other deformity of the eye. Because the mathematical sub-formulae that control the base curves along the two meridians are known, the exact shape of spherical-aspherical contact lens may be precisely controlled. The base curve of spherical-aspherical contact lens 300 will more closely conform to the shape of the patient's eye relative to the base curve of known contact lenses. Thus, not only will the patient be more comfortable with the contact lens on the patient's eye, but the orientation of the contact lens while on the eye will be less likely to shift. For this reason, any wavefront properties created on the front surface, or the surface opposite the back surface, of contact lens 300 will maintain a desired orientation. Wavefront properties correct for higher order aberrations, such as coma, spherical aberration, and other aberrations that affect the person's vision. Accordingly, patients who use the contact lens of the present invention are less likely to see visual disturbances caused by a shift in orientation of contact lens 300 and are likely to have their vision corrected by contact lens 300 in a desired manner. Additionally, contact lens 300 is more comfortable to wear because contact lens 300 conforms to the shape of the particular patient's cornea.

Figure 6:
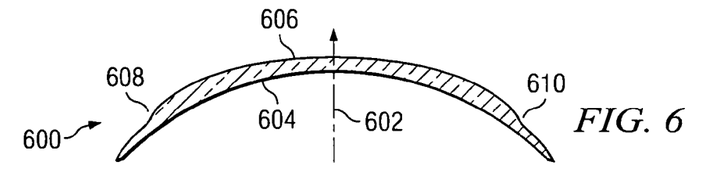
FIG. 6 shows a cross section of a contact lens, in accordance with an illustrative embodiment of the present invention.

FIG. 6 shows a cross section of a contact lens 600, in accordance with an illustrative embodiment of the present invention. With reference to FIG. 3, the cross section shown in FIG. 6 is drawn along meridian 4—4, though contact lens 600 is different than contact lens 300 in FIG. 3. Like contact lens 300, contact lens 600 has a base curve 604 that is aspherical. However, the thickness and the shape of the front surface 606 of contact lens 600 vary in an irregular manner. For example, the thickness of contact lens 600 abruptly changes at the areas generally indicated by area 608 and area 610. The thickness and shape of contact lens 600 changes more abruptly at area 608 relative to area 610.

The purpose of the change in thickness in contact lens 600 is to provide the optical properties required to correct the vision of one eye of a particular patient. However, the optical properties of contact lens 600, vis-à-vis the eye of the patient, depend on the orientation of contact lens 600 on the eye. Thus, base curve 604 of contact lens 600 is controlled, as described in relation to FIG. 4, such that contact lens 600 conforms to the shape of the eye of the patient. Accordingly, visual axis 602 of contact lens 600 will tend to maintain an alignment with the visual axis of the patient's eye. For this reason, the optical effect of contact lens 600 tends to maintain a desired effect as long as contact lens 600 is worn.

Figure 7:
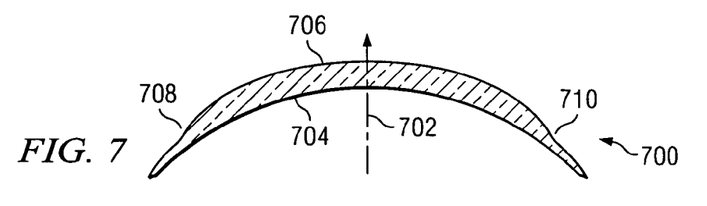
FIG. 7 shows a cross section of the contact lens shown in FIG. 6, in accordance with an illustrative embodiment of the present invention.

FIG. 7 shows a cross section of the contact lens shown in FIG. 6, in accordance with an illustrative embodiment of the present invention. With reference to FIG. 3, the cross section shown in FIG. 7 is drawn along meridian 4—4, though contact lens 700 is different than contact lens 300 in FIG. 3. Like contact lens 300, contact lens 700 has a base curve 704 that is spherical. However, the thickness and the shape of the front surface 706 of contact lens 700 vary in an irregular manner. For example, the thickness of contact lens 700 abruptly changes at the areas generally indicated by area 708 and area 710. The thickness and shape of contact lens 700 changes more abruptly at area 708 relative to area 710.

The purpose of the change in thickness in contact lens 700 is to provide the exact optical properties required to correct the vision of one eye of a particular patient. However, the optical effect of contact lens 700, vis-à-vis the eye of the patient, depends on the orientation of contact lens 700 on the eye. Thus, base curve 704 of contact lens 700 is controlled, as described in relation to FIG. 4, such that contact lens 700 conforms to the shape of the eye of the patient. Also as described with respect to FIG. 4 and FIG. 5, contact lens 600/700 shown in FIG. 6 and FIG. 7 may be referred to as a spherical-aspherical contact lens. The spherical-aspherical shape of back curve 604/704 helps visual axis 702 of contact lens 700 to maintain an alignment with the visual axis of the patient's eye. For this reason, the optical effect of contact lens 700 tends to maintain a desired effect as long as contact lens 700 is worn.

Figure 8:
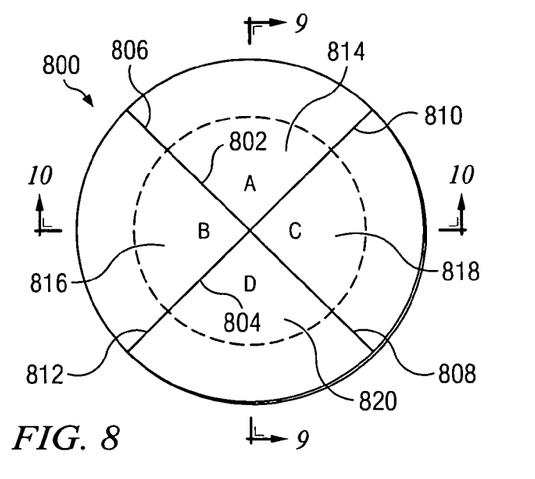
FIG. 8 shows a contact lens, in accordance with an illustrative embodiment of the present invention.

FIG. 8 shows a contact lens 800, in accordance with an illustrative embodiment of the present invention. The contact lens shown in FIG. 8 shows that the meridians shown in FIG. 3 may be further subdivided into sub-meridians or sub-axes. Axis 802 is perpendicular or orthogonal to axis 804. Axis 802 may be subdivided into sub-axis 806 and sub-axis 808. Likewise, axis 804 may be subdivided into sub-axis 810, and sub-axis 812. Sub-axis 806 and sub-axis 808 are bisected by axis 804. Similarly, sub-axis 810 and sub-axis 812 are bisected by axis 802. The back surface of the contact lens has a first base curve associated with the first sub-axis. The back surface of the contact lens has a second base curve associated with the second sub-axis. The back surface of the contact lens has a third base curve associated with the third sub-axis. The back surface of the contact lens has a fourth base curve associated with the fourth sub-axis. In the contact lens in aspects of the present invention, the first base curve, the second base curve, the third base curve, and the fourth base curve are individually controlled such that a shape of the back surface of the contact lens conforms to a measured shape of a cornea of a human.

Contact lens 800 may also be considered to be subdivided into four sections, section A 810, section B 812, section C 814, and section D 816. The base curve of contact lens 800 may be individually controlled in each section by controlling mathematical equations that describe the shape of contact lens 800 associated with any given sub-axis. Thus, as a whole, the base curve of contact lens 800 conforms very closely to the cornea of an eye of a patient. The very close fit of the contact lens increases the usefulness of the optical properties of the contact lens, because the position of the contact lens on the eye is more likely to cause the visual axis of the contact lens to remain in a constant position relative to the visual axis of the patient.

In addition, each sub-axis may be further sub-divided into smaller sub-axes. Further sub-dividing each axis increases the level of control a manufacturer has when defining or manufacturing the base curve of the contact lens. Each individual sub-axis will have a curvature associated with it, such that the base curve can be controlled exactly at any point on contact lens 800. Similarly, further sub-dividing each axis creates a larger number of sectors, other than the four sectors 814, 816, 818, and 820 shown. Further sub-dividing each axis creates sectors defined by portions of circular sectors, where a particular sector is defined by the circular sector defined by the farthest points on two adjacent sub-axes less than the circular sector defined by the closest points on two adjacent axes. The terms "farthest" and "closest" are relative to the center of contact lens 800. Each particular sector may have a different base curve associated with it.

Still further, each individual axis 802 and 804 need not be divided evenly, as shown in FIG. 8. Similarly, if each sub-axis 814, 816, 818, and 820 is further sub-divided, then each sub-division need not be divided evenly. Thus, a portion of each sub-axis may be longer than another portion. Each portion of a sub-axis may have an individual curvature associated with it, such that the base curve can be controlled in the manner described above.

In one example, the curvature of the base curve associated with sub-axis 806 is the same as the curvature of the base curve associated with sub-axis 808 such that the curvature of the base curve associated with axis 802 is spherical. In this case, the radius of curvature in Cartesian coordinates is $r=SQRT(x^2+y^2)$. For the same contact lens, the curvature of the base curve associated with sub-axis 810 is the same as the curvature of the base curve associated with sub-axis 812 such that the curvature of the base curve associated with axis 804 is aspherical. In this case, the radius of curvature in Cartesian coordinates is $r=(p*x^2+y^2)/2x$ where $p=1-e$ and e is the eccentricity. In the case where e=0, the aspherical equation yields a sphere. Thus, r is the same at the center of the contact lens, as defined by the visual axis. In another example, the base curve associated with both axis 802 and axis 804 may be defined by the aspherical equation.

In another example, the equations for defining the base curve of a contact lens may be expressed in terms of R, the apical radius, D, the diameter of the contact lens, e, the eccentricity, p, which is defined as $1-e^2$, and Z, the sagittal of the lens at X where X=D/2. In this case for a spherical meridian, $Z=R-SQRT(R^2-(D/2)^2)$. For an aspherical meridian, $Z=(R-SQRT(R^2-p*(D/2)^2))/p$ Contact lens 800 shown in FIG. 8 may be reduced to contact lens 300 shown in FIG. 3. In this case, the first base curve, associated with sub-axis 806, is the same as the second base curve, associated with sub-axis 808, such that contact lens 800 has a base curve defined associated with axis 802 according to a single mathematical formula. Similarly, the third base curve, associated with axis 810, is the same as the fourth base curve, associated with axis 810, such that contact lens 800 has a base curve defined associated with axis 804 according to a single, though different, mathematical formula. For the contact lens shown in FIG. 3, the base curve associated with axis 802 is spherical. The base curve associated with axis 804 is aspherical. Accordingly, contact lens 800 may be reduced to the spherical-aspherical contact lens 300 shown in FIG. 3.

However, contact lens 800 shows a general method of defining and controlling the base curve of a contact lens in these illustrative examples. For example, the base curve associated with each sub-axis may be different relative to the base curve associated with each other sub-axis. The base curve associated with first sub-axis 806 may be different than the base curve associated with second sub-axis 808. The base curve associated with third sub-axis 810 may be different than the fourth base curve associated with sub-axis 812. The base curve associated with any of sub-axes 806, 808, 810, or 812 may be irregular, uniform, spherical, aspherical, or adapted to conform to any mathematical equation that defines a surface in any given coordinate system. Thus, for example, the base curve of contact lens 800 may be different in sector A 814, sector B 816, sector C 818, and sector D 820. In a more specific example, the base curve in sector A 814 is steepened, the base curve in sector C 818 is flatter, and the base curve in sector B 816 and sector D 820 are the same, though different than the base curve s in sector A 814 and sector D 820.

Contact lens 800 of FIG. 8 and contact lens 300 of FIG. 3 also may be described in terms of spherical coordinates. Because a contact lens described in terms of polar coordinates is the same as the same contact lens described in terms of Cartesian coordinates, the contact lens has a back surface which is disposed on the cornea of the eye when the contact lens is placed on the eye. The contact lens also has a front surface opposite the back surface. The shape of the back surface is mapped according to spherical coordinates. As described above, spherical coordinates for a contact lens include a radius defined by a distance between a fixed point and a point on the back surface of the contact lens, an azimuth angle defined relative to a first axis associated with the contact lens and a second fixed axis associated with the contact lens, and a polar angle defined relative to a third axis associated with the contact lens. In the example shown in FIG. 2, the fixed point is the intersection of all three axes, the first axis is X-axis 204, the second axis is Y-axis 206, and the third axis is Z-axis 208. However, the designation of which axis is "X," "Y," and "Z" may vary as the orientations of the axes only change how the shape of the contact lens is described, and do not change the actual shape of the contact lens. In any case, the radius varies according to a first formula as the azimuth angle is varied. The radius varies according to a second formula as the polar angle is varied. If the first formula and the second formula are different, then the back surface of the contact lens may have, for example, a spherical-aspherical shape as described above.

In another example, the first formula and/or the second formula may include sub-formulae that change at the instant that the polar angle and/or the azimuth angle reach specified values. For example, the first formula may include a first sub-formula and a second sub-formula. The first sub-formula applies when the azimuth angle varies between 0 degrees and 90 degrees and the second sub-formula applies when the azimuth angle varies between 90 degrees and 180 degrees. Similarly, the second formula may include a third sub-formula and a fourth sub-formula. The third sub-formula applies when the polar angle varies between –90 degrees and 0 degrees. The fourth sub-formula applies when the polar angle varies between 1 degree and 90 degrees. By controlling which equations apply to each different sector on the contact lens, the base curve may be precisely controlled. Thus, for example, the base curve of contact lens 800 may be different in sector A 914, sector B 816, Sector C 818, and Sector D 820, as described above.

Thus, in an exemplary contact lens, the apex of the contact lens is at the point where the radius intersects the contact lens and the polar angle is 90 degrees. In the exemplary contact lens, the first formula comprises a first sub-formula, a second sub-formula, a third sub-formula, and a fourth sub-formula. The radius varies according to the first sub-formula as the azimuth angle varies and wherein the azimuth angle is between about 0 degrees about 90 degrees and the polar angle is between about 0 degrees and about 90 degrees. The radius varies according to the second sub-formula as the azimuth angle varies and wherein the azimuth angle is between about 90 degrees about 180 degrees and the polar angle is between about 0 degrees and about 90 degrees. The radius varies according to the third sub-formula as the azimuth angle varies and wherein the azimuth angle is between about 180 degrees about 270 degrees and the polar angle is between about 0 degrees and about 90 degrees. The radius varies according to the fourth sub-formula as the azimuth angle varies and wherein the azimuth angle is between about 270 degrees about 360 degrees and the polar angle is between about 0 degrees and about 90 degrees.

For the above description of contact lens 800 in terms of spherical coordinates, the base curve of the contact lens may be considered to vary according to four different formulae across four sub-meridians because the exemplary angles described above vary exactly along meridian lines 802 and 804. Similarly, the exemplary angles described above vary exactly along sub-meridians 806, 808, 810, and 812. Thus, the same contact lens described vis-à-vis FIG. 8 may be described using spherical coordinates.

Figure 9:
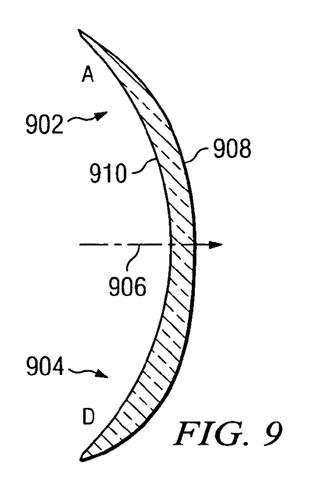
FIG. 9 shows a cross section of the contact lens shown in FIG. 8, in accordance with an illustrative embodiment of the present invention.

FIG. 9 shows a cross section of the contact lens shown in FIG. 8, in accordance with an illustrative embodiment of the present invention. Exemplary contact lens 900 corresponds to contact lens 800 in FIG. 8 and the cross section of contact lens 900 is shown along line 9—9 shown in FIG. 8. Thus, sector A 902 corresponds to sector A 814 in FIG. 8 and sector B 904 corresponds to sector D 820 in FIG. 8. Axis 906 corresponds to the visual axis of contact lens 900.

Exemplary contact lens 900 has a front surface 906 that has a relatively constant curvature. However, the back surface 908 has a base curve that varies. Specifically, the base curve in sector D 904 is greater than the base curve in sector A 902. Thus, the portion of the contact lens in sector D 904 is thicker than the portion of the contact lens in sector A 902.

Figure 12:
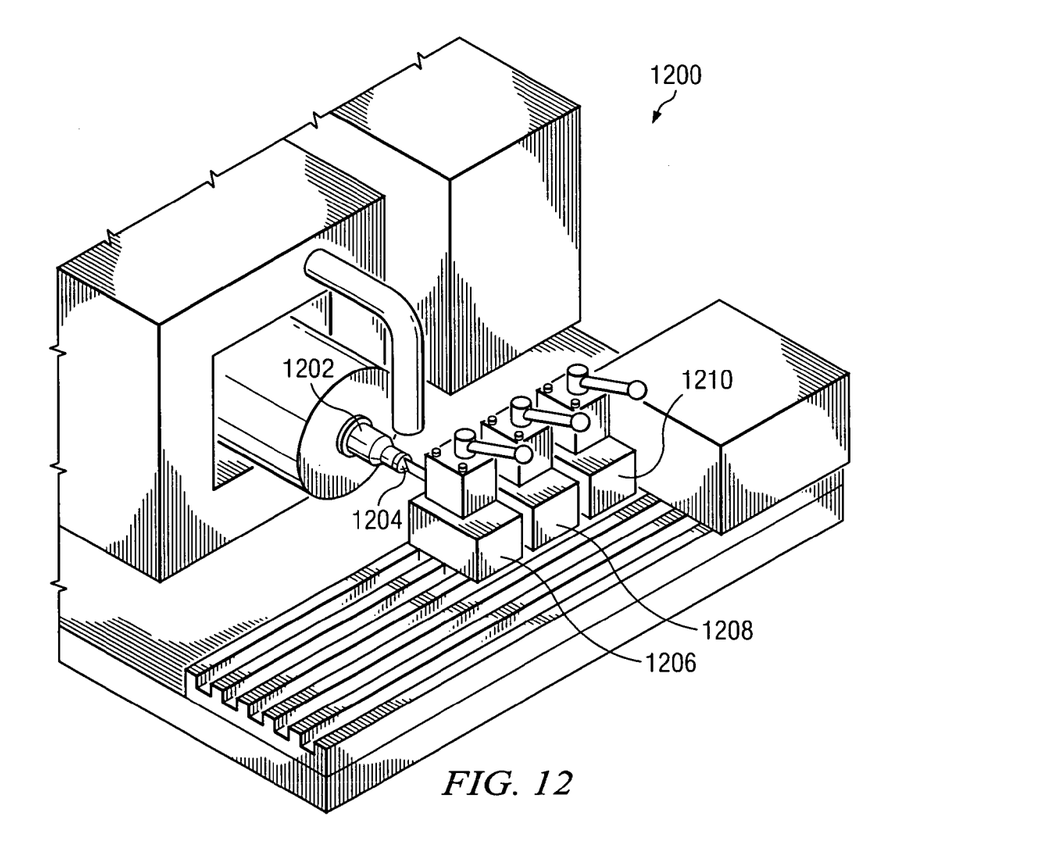
FIG. 12 shows a device for manufacturing a contact lens, in accordance with an illustrative embodiment of the present invention.

Contact lens 900 may be formed by controlling the base curve according to the methods described vis-à-vis FIG. 3 through FIG. 8 and in FIG. 12. The base curve of contact lens 900, in this example, has a shape that exactly conforms to the measured shape of a particular patient's eye. Thus, contact lens 900 will rest comfortably on the patient's eye and tend to maintain the same orientation on the eye.

Figure 10:
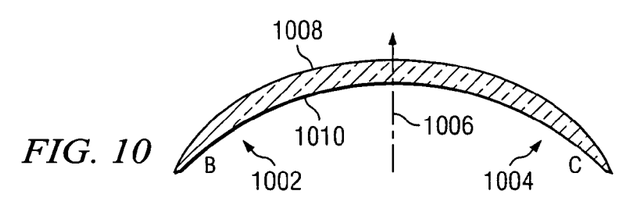
FIG. 10 shows a cross section of the contact lens shown in FIG. 8, in accordance with an illustrative embodiment of the present invention.

FIG. 10 shows a cross section of the contact lens shown in FIG. 8, in accordance with an illustrative embodiment of the present invention. Exemplary contact lens 1000 corresponds to contact lens 800 in FIG. 8 and the cross section of contact lens 1000 is shown along line 10—10 shown in FIG. 8. Thus, sector B 1002 corresponds to sector B 816 in FIG. 8 and sector C 1004 corresponds to sector C 818 in FIG. 8. Axis 1006 corresponds to the visual axis of contact lens 1000.

Exemplary contact lens 1000 has a front surface 1006 that has a relatively constant curvature, though the front side may have a different curvature or may be provided with different components to modify the optical properties of contact lens 1000. Similarly, back surface 1008 has a relatively constant base curve. Thus, the portion of the contact lens in sector B 1002 has the same thickness as the portion of the contact lens in sector C 1004.

Contact lens 800 shown in FIG. 8 through FIG. 10 shows that one may control the base curve of a contact lens exactly. Control over the base curve of contact lens 800 is accomplished by controlling how the shape of the back surface is formed along meridians 802 and 804 and along sub-meridians 806, 808, 810, and 812. Each individual sub-meridian 806, 808, 810, and 812 has a base curve associated with it. The first base curve, the second base curve, the third base curve, and the fourth base curve are individually controlled such that a shape of the back surface of the contact lens conforms to a measured shape of a cornea of a human. Similarly, the shape of the back surface of contact lens 800 may be controlled according to a spherical coordinate system, as described with respect to FIG. 3 through FIG. 5.

Figure 11:
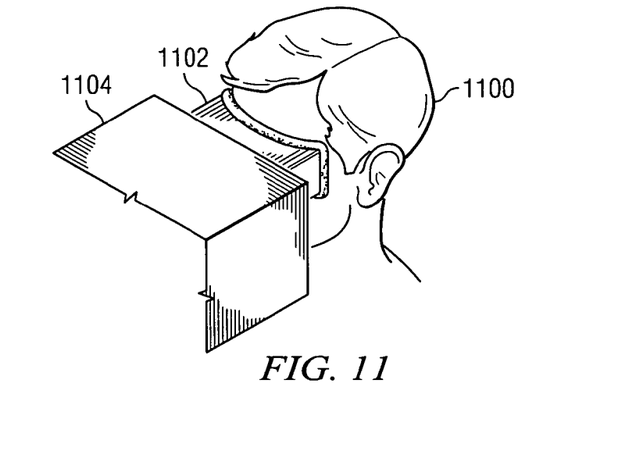
FIG. 11 shows a device for mapping the shape of a cornea of a human eye, in accordance with an illustrative embodiment of the present invention.

FIG. 11 shows a device for mapping the shape of a cornea of a human eye, in accordance with an illustrative embodiment of the present invention. A human 1100 presses his face into visor 1002 of device 1004, with the eyes looking straight into visor 1002. Device 1004 is adapted to measure the exact shape of the cornea of each of the human's eyes. Device 1004 produces a corneal shape map for each eye. Using the methods and devices described herein, a contact lens may be formed wherein the base curve of the contact lens has a shape corresponding to the corneal shape map. For example, the base curve associated with each meridian of the contact lens may be controlled such that the contact lens matches a spherical-aspherical corneal shape map, such as when the patient has an astigmatism, or may be controlled such that the contact lens matches an irregular corneal shape map, such as when the patient has a condition that deforms the shape of the cornea.

In addition, the device shown in FIG. 11 may measure other qualities of a patient's eye. For example, device 1104 may map the wavefront profile of the eye using a wavefront analyzer. Similarly, device 1104 may include an aberrometer for precisely measuring the higher order aberrations seen by a patient. Device 1104 may also produce a power map showing the optical corrections needed for a particular patient. Thus, a map of the shape of the cornea may also include a power map and may include other information describing the wavefront profile of the eye. A wavefront profile may be expressed as a Zernike polynomial. An example of a Zernike polynomial is $SQRT(5)*[6r^4-6(1+e^2)r^2+(1+e^2+e^4)]/(1-e^2)^2$ where r is the radius of the pupil and e is the annulus of the optical element. Additional information on Zernike polynomials may be found in reference texts.

FIG. 12 shows a device for manufacturing a contact lens, in accordance with an illustrative embodiment of the present invention. Device 1200 is capable of manufacturing contact lenses. Device 1200 may be modified and adapted to manufacture contact lenses according to the methods described herein. Device 1200 includes a lathe 1202 and one or more anvils 1206, 1208, and 1200. Contact lens 1204 rests on the end of lathe 1202. A motor within device 1200 rotates lathe 1202. Other components are provided such that lathe 1202 may translate inwardly and outwardly as well as transversely with respect to anvils 1206, 1208, and 1210. Computer programs or software control the motion and operation of device 1200 such that the base curve of a contact lens may be precisely controlled according to the methods described herein. Computer programs for controlling the lathe may be stored on a physical computer usable medium and executed by a processor. The physical computer usable medium and the processor are connected by a bus such that the hardware components may communicate with each other. The processor, bus, and physical computer usable medium together form a computer. The computer is also operably connected to lathe 1202 or built into lathe 1202 such that the computer program together with the computer may control the movement and actions of lathe 1202.

Regarding the software for controlling the manufacturing process for the content lens of the present invention, the present invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Thus, memory elements such as RAM, ROM, and various other forms of memory may be storage devices connected to a bus.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although device 1200 is adapted to manufacture hard contact lenses, the methods and devices described herein may be adapted to manufacture soft contact lenses and other kinds of optical lenses. Thus, the description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A single component contact lens comprising:
    a front surface;
    a back surface formed to fit a cornea of an eye;
    a first axis, wherein the first axis has a first sub-axis and a second sub-axis;
    a second axis, wherein the first axis and the second axis are orthogonal to each other and wherein the second axis has a third sub-axis and a fourth sub-axis;
    a first base curve for the back surface, wherein the first base curve is associated with the first sub-axis;
    a second base curve for the back surface, wherein the second base curve is associated with the second sub-axis;
    a third base curve for back surface, wherein the third base curve is associated with the third sub-axis; and
    a fourth base curve for the back surface, wherein the fourth base curve is associated with the fourth sub-axis, wherein the first base curve, the second base curve, the third base curve, and the fourth base curve are selected to form a shape for the back surface that conforms to a measured shape of the cornea.

2. The single component contact lens of claim 1 wherein: the first base curve and the second base curve are equal;

the first base curve and the second base curve are spherical;

the third base curve and the fourth base curve are equal; and the third base curve and the fourth base curve are aspherical.

3. The single component contact lens of claim 1 wherein the first base curve is different than the second base curve and the third base curve is different than the fourth base curve.

4. The single component contact lens of claim 1 wherein the first base curve is irregular and the second base curve is uniform.

5. The single component contact lens of claim 4 wherein the third base curve is irregular and the fourth base curve is uniform.

6. The single component contact lens of claim 1 wherein the first base curve is aspherical and the second base curve is spherical.

7. The single component contact lens of claim 6 wherein the third base curve is aspherical and the second base curve is spherical.

8. A single component contact lens comprising:
a front surface;
a back surface formed to fit a cornea of an eye; and
a shape for the back surface that is mapped according to spherical coordinates, wherein the spherical coordinates comprises a radius defined by a distance between a fixed point and a point on the back surface, an azimuth angle defined relative to a first fixed axis associated with the single component lens and a second fixed axis associated with the single component lens, and a polar angle defined relative to a third axis associated with the single component lens, wherein the radius varies according to a first formula as the azimuth angle is varied, wherein the radius varies according to a second formula as the polar angle is varied, and wherein the first formula and the second formula are different.

9. The single component contact lens of claim 8 wherein the first formula results in the back surface having a spherical base curve as the azimuth angle is varied.

10. The single component contact lens of claim 9 wherein the second formula results in the back surface having an aspherical base curve as the polar angle is varied.

11. The single component contact lens of claim 8 wherein the first formula results in the back surface having an irregular base curve as the azimuth angle is varied.

12. The single component contact lens of claim 11 wherein the second formula results in the back surface having an irregular base curve as the polar angle is varied.

13. The single component contact lens of claim 8 wherein the first formula and the second formula are individually defined such that the shape of the back surface of the single component lens conforms to the measured shape of a cornea of a human.

14. The single component contact lens of claim 8 wherein:
the center of the single component lens is at the point where the radius intersects the single component lens and where the polar angle is 90 degrees;
the first formula comprises a first sub-formula, a second sub-formula, a third sub-formula, and a fourth sub-formula;
the radius varies according to the first sub-formula as the azimuth angle varies and wherein the azimuth angle is between about 0 degrees about 90 degrees and the polar angle is between about 0 degrees and about 90 degrees;
the radius varies according to the second sub-formula as the azimuth angle varies and wherein the azimuth angle is between about 90 degrees about 180 degrees and the polar angle is between about 0 degrees and about 90 degrees;
the radius varies according to the third sub-formula as the azimuth angle varies and wherein the azimuth angle is between about 180 degrees about 270 degrees and the polar angle is between about 0 degrees and about 90 degrees; and
the radius varies according to the fourth sub-formula as the azimuth angle varies and wherein the azimuth angle is between about 270 degrees about 360 degrees and the polar angle is between about 0 degrees and about 90 degrees.

15. The single component contact lens of claim 14 wherein the first sub-formula, the second sub-formula, the third sub-formula, and the fourth sub-formula are all different.

16. The single component contact lens of claim 15 wherein the first sub-formula, the second sub-formula, the third sub-formula, and the fourth sub-formula are individually defined such that a shape of the back surface of the single component lens will conform to a measured shape of a cornea of a human.

* * * * *